United States Patent
Bohner et al.

Patent Number: 6,041,882
Date of Patent: *Mar. 28, 2000

[54] VEHICLE STEERING SYSTEM

[75] Inventors: Hubert Bohner, Böblingen; Martin Moser, Fellbach, both of Germany

[73] Assignee: DaimlerChrysler AG, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/802,602

[22] Filed: Feb. 19, 1997

[30] Foreign Application Priority Data

Feb. 24, 1996 [DE] Germany ............ 196 07 028

[51] Int. Cl.⁷ ...................................... B62D 5/04
[52] U.S. Cl. ............................. 180/402; 701/42
[58] Field of Search ................. 180/402, 443, 180/444, 445, 446; 701/41, 42, 43, 44

[56] References Cited

U.S. PATENT DOCUMENTS

| | | | |
|---|---|---|---|
| 4,830,127 | 5/1989 | Ito et al. ................... | 180/446 |
| 5,097,917 | 3/1992 | Serizawa et al. ........... | 180/402 |
| 5,236,335 | 8/1993 | Takeuchi et al. ........... | 180/446 |
| 5,247,441 | 9/1993 | Serizawa et al. . | |
| 5,251,135 | 10/1993 | Serizawa et al. ........... | 180/446 |
| 5,347,458 | 9/1994 | Serizawa et al. ........... | 180/402 |
| 5,528,497 | 6/1996 | Yamamoto et al. ......... | 180/446 |
| 5,729,454 | 3/1998 | Amsallen .................... | 477/120 |

FOREIGN PATENT DOCUMENTS

| | | |
|---|---|---|
| 2 217 274 | 10/1989 | United Kingdom . |
| 2 284 399 | 6/1995 | United Kingdom . |
| 2 290 511 | 1/1996 | United Kingdom . |

*Primary Examiner*—Brian L. Johnson
*Assistant Examiner*—Avraham H. Lerner
*Attorney, Agent, or Firm*—Klaus J. Bach

[57] ABSTRACT

In a steering system for the steered wheels of a vehicle having a steering device such as a steering wheel, a desired wheel angle position transmitter operatively connected to the steering device, a motorized actuating unit for steering the steered vehicle wheels, and a hand force controller operatively connected to the steering device for generating a steering device return force to be felt by a vehicle operator, the energization of the hand force controller is dependent on the sum of a first signal which depends on the actual position of the steering device and the vehicle speed and a second signal which depends on the rate of actuation of the steering device and the vehicle speed.

3 Claims, 1 Drawing Sheet

VEHICLE STEERING SYSTEM

BACKGROUND OF THE INVENTION

The invention relates to a steering system for road vehicles.

In conventional vehicle steering systems, the steering wheel provided as a steering means is mechanically connected to the steered vehicle wheels, i.e. the steering wheel and the steered vehicle wheels are mechanically positively coupled to one another. A mechanical positive coupling of this kind has so far been a legal requirement on conventional road vehicles.

For the actuation of wing flaps and control surfaces on aircraft however, arrangements are known with no mechanical positive coupling whatsoever between the rudder or the wing flaps on the one hand, and the associated control means on the other hand. Rather, the control surfaces or wing flaps are functionally connected to the corresponding control means via an electronic control path, i.e. the control means specifies a desired position value, in accordance with which the control surfaces or wing flaps are then adjusted by means of correspondingly controlled motorized actuating units. This concept, which is also referred to as "fly by wire", is now so reliable that it is used even in passenger aircraft.

Also in vehicle steering systems, comparable systems are now being developed, wherein the steering control means, that is, the steering wheel operates a desired-value transmitter, and a motorised actuating unit controlled as a function of the desired value performs the steering of the steered vehicle wheels. Since there is no positive coupling between the steered vehicle wheels and the steering control means or steering wheel, a system response force which can be felt at the steering means or steering wheel must be artificially generated by means of a hand-force generator which is operatively connected to the steering means or steering wheel.

It is accordingly the object of the invention to provide a simple and reliable control concept for generating the reaction-force which is felt by the vehicle operator.

SUMMARY OF THE INVENTION

In a steering system for the steered wheels of a vehicle having a steering means such as a steering wheel, a desired wheel angle position transmitter operatively connected to the steering means, a motorized actuating unit for steering the steered vehicle wheels, and a hand force controller operatively connected to the steering means for generating a steering means return force to be felt by a vehicle operator, the energization of the hand force controller is dependent on the sum of a first signal which depends on the actual position of the steering means and the vehicle speed and a second signal which depends on the rate of actuation of the steering means and the vehicle speed.

The invention is based on the general idea of employing, for generating the reaction force, as far as possible independent elements including a restoring force on the one hand, and a resistance force similar to the frictional resistance of a conventional steering system, on the other hand. In this arrangement, the first signal-transmitter arrangement generates the signal for the restoring force, while the second signal-transmitter arrangement generates the signal for the simulated friction and the like.

The invention offers the advantage of a clearly organized structure which can be checked easily during inspection. Moreover, a highly reliable, flexibly adjustable control behavior with high operational reliablility is achieved.

For example, the first signal-transmitter arrangement can, like a conventional steering system, generate a restoring torque that increases in a predeterminable manner as the speed of travel increases and the steering angle increases, by generating appropriate control signals. If, on the other hand, the second signal-transmitter arrangement generates a steering resistance signal which increases with the rate of actuation of the steering means or steering wheel and also with the speed of travel of the vehicle, a clearly perceptible greater restoring force in the case of steady-state cornering (constant steering angle), for example, cannot lead to an excessively rapid return of the steering member or steering wheel and of the steered vehicle wheels.

If one of the signal-transmitter arrangements is operating in a faulty manner, a fixed value for the restoring force or the simulated steering resistance can be generated automatically if necessary, so as to provide for an operating behavior which is at least approximately similar to a signal-transmitter arrangement operating in a fault-free manner. The corresponding fixed values chosen are preferably those which would be established at a relatively high speed of travel and relatively large steering angles or rates of actuation (in the case of fault-free operation).

According to a preferred embodiment, the hand- or return-force generator can be an electric motor, the actuating force of which is controlled by the signal-transmitter arrangements, which preferably operate electrically or electronically.

In this embodiment, it is possible in a particularly simple manner to achieve a limitation of the hand-force that can be felt at the steering means or steering wheel. Only a limiter for the electric operating voltage is needed herefor.

Preferred features of the invention and particularly advantageous embodiments are described below with reference to the drawings.

DESCRIPTION OF AN EMBODIMENT OF THE INVENTION

Figure 1:
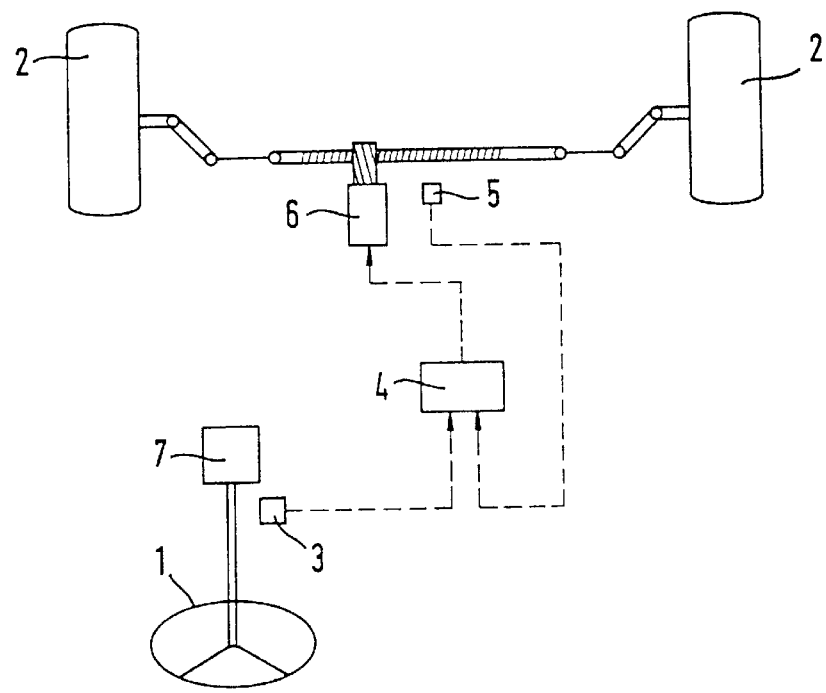
FIG. 1 shows a schematically represented motor vehicle with a steering system according to the invention and FIG. 2 shows a schematic circuit diagram for a control system of an electric motor serving as a hand-force genrator.

According to FIG. 1, a vehicle, not illustrated in greater detail in other respects, has a steering wheel 1 to be actuated by the driver, and steered vehicle wheels 2 controlled by the steering wheel 1. The steering wheel 1 actuates a desired-value transmitter 3, the signals of which represent the steering angles to be set at the steered vehicle wheels 2. These desired-value signals are fed to a desired-value input of a controller 4. An actual-value input of the controller 4 is connected to an actual-value transmitter 5, the signals of which represent the respective actual values of the steering angle of the steered vehicle wheels 2. As a function of a desired value/actual value comparison, the controller 4 controls an actuating unit 6 such as an electric motor, which is operatively connected to the steered vehicle wheels 2 by way of a conventional steering linkage—for example a pinion, a rack and control rods—and which provides for the steering movements of the steered vehicle wheels 2. In this way, the actual value of the steering angle of the steered vehicle wheels 2 is made to follow the desired value set by the steering wheel 1 at the desired-value transmitter 3.

The steering wheel 1 is furthermore operatively connected to an electric motor 7 which serves as a hand-force controller which provides, in a manner described below, a hand force that can be felt at the steering wheel 1, so that a restoring force and an actuating resistance can be felt at the steering wheel 1, like with a conventional vehicle steering system with mechanical transmission between the steering wheel 1 and the steered vehicle wheels 2.

Figure 2:
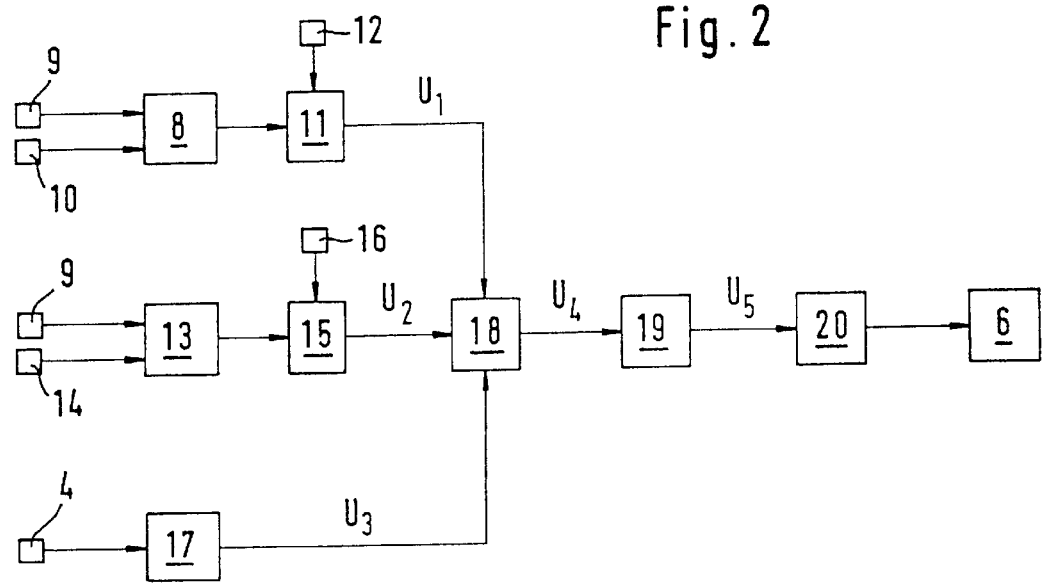

As shown in FIG. 2, a first signal transmitter 8 is connected on the input side to a signal transmitter 9 for the speed of vehicle travel and to a signal transmitter 10, the signal of which represents the value of the deviation of the actual position of the steering wheel 1 from its straight-ahead position. An output signal is generated as a function of these input signals. Connected to the output of the first signal transmitter 8 is a switching stage 11, which is connected to a sensor 12, the signal of which indicates whether the steering wheel 1 has been turned to the left or to the right relative to its straight-ahead position. From the output signal of the signal transmitter 8 and of the sensor 12, the switching stage 11 now generates an output signal $U_1$, which can be regarded as the desired value for a restoring force with which the steering wheel 1 should be returned from its position of displacement from the straight-ahead position to the straight-ahead position.

A second signal transmitter 13 is, in turn, connected to the signal transmitter 9 to obtain therefrom the speed of travel and, furthermore, to a signal transmitter 14, the signal of which represents the rate of actuation of the steering wheel 1. Connected to the output of the signal transmitter 13 is a switching stage 15, which is connected to a sensor 16, the signal of which represents the direction of the displacement of the steering wheel 1. From the signals of the signal transmitter 13 and of the sensor 16, the switching stage 15 generates a signal $U_2$ which can be regarded as a value for an actuating resistance that comes into effect during rotation of the steering wheel 1.

A third signal transmitter 17 can be connected to the output of the controller 4 (cf. FIG. 1) so as to generate a signal $U_3$ which represents the forces acting on the steered vehicle wheels 2.

The signals $U_1$, $U_2$ and $U_3$ are added in a switching stage 18 to generate a composite signal $U_4$. This signal is then fed to a limiter 19 which "chops" the signals of the switching stage 18 as soon as they exceed a specifiable absolute value.

The signal $U_5$ so generated controls a power stage 20 which supplies the electric motor 7 with a corresponding operating voltage for forward or reverse operation, with the result that limited restoring forces or simulated steering resistances can be felt at the steering wheel 1.

The system illustrated in FIG. 2 can be implemented by means of simple and reliable electronic components.

In addition to the embodiment illustrated, signals of further sensors (not shown) can be added which, for example, represent the transverse acceleration, the attitude angle, the yaw rate or other variables. It is thereby possible to influence or change the hand- or return-force acting on the steering wheel also as a function of these variables.

What is claimed is:

1. A steering system for the steered wheels of vehicles, comprising a steering means, a desired wheel angle position transmitter operatively connected to said steering means providing a desired wheel angle value, a motorized actuating unit controlled as a function of said desired wheel angle position value for the steering of said steered vehicle wheels, a hand-force control operatively connected to said steering means for the generation of a steering wheel hand force that can be felt at said steering means dependent on a signal sum comprising a first signal generated by a first signal-transmitter arrangement and dependent on the actual position of the steering means and on the speed of vehicle travel, and a second signal, generated by a second signal-transmitter arrangement dependent on the rate of actuation of said steering means and on the speed of vehicle travel, said first and second signal transmitter arrangements each generating, in the event of a fault, an output signal with a predetermined fixed value as it is provided during fault-free vehicle operation at high vehicle speeds and at large steering angles or rates of actuation of said steering means.

2. Steering system according to claim 1, wherein a third signal-transmitter arrangement is provided which generates a signal dependent on the actuating force of said actuating unit.

3. A steering system according to claim 1, wherein means are provided for limiting the hand force that can be generated by said hand force controller.

* * * * *